Patented Nov. 18, 1952

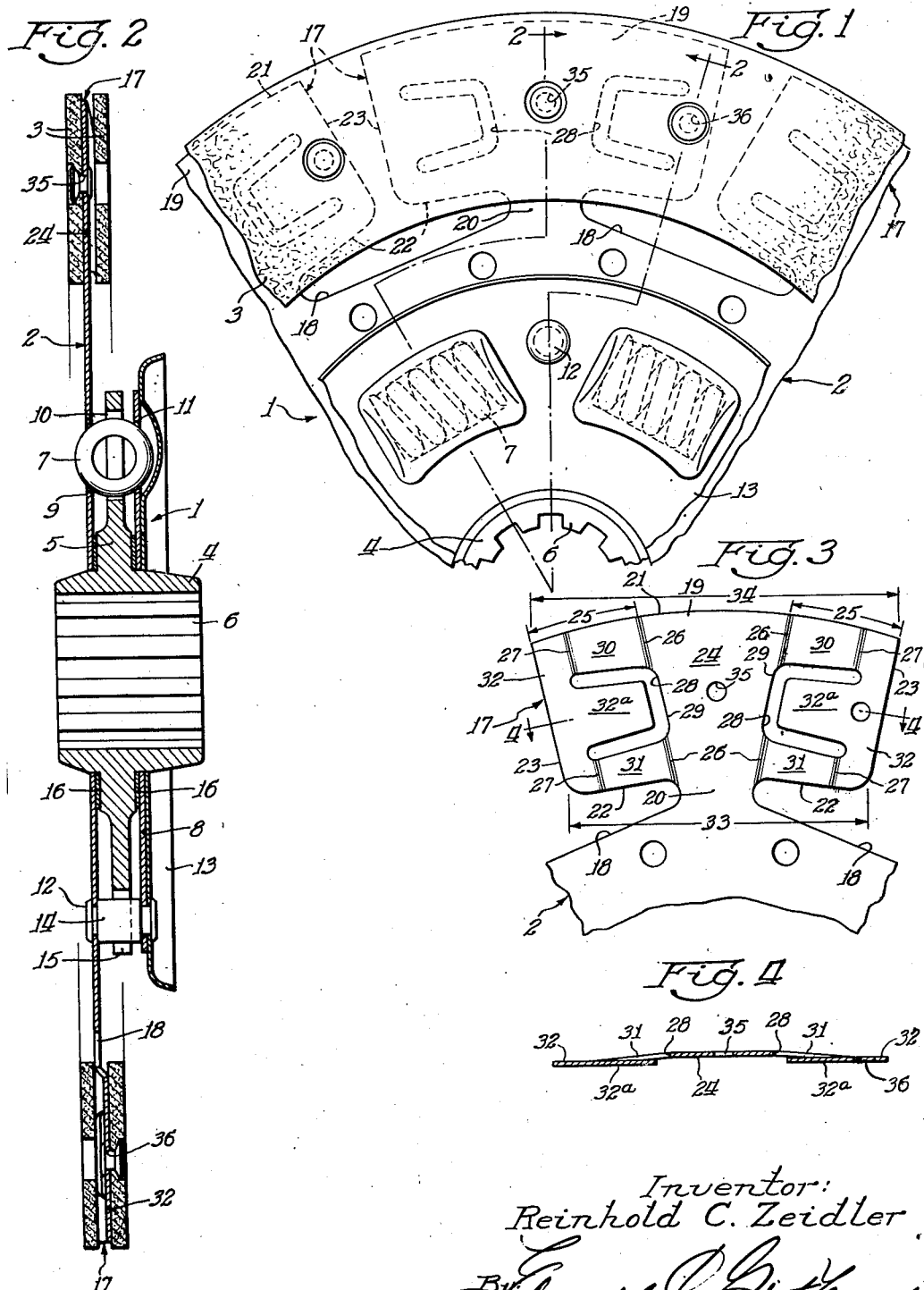

2,618,369

UNITED STATES PATENT OFFICE 2,618,369

CLUTCH DRIVEN PLATE

Reinhold C. Zeidler, Detroit, Mich., assignor to Borg-Warner Corporation, Chicago, Ill., a corporation of Illinois Application March 24, 1948, Serial No. 16,832

4 Claims. (Cl. 192—107)

The present invention relates generally to improvements in friction clutches of the type which are preferably adapted for use in automotive vehicles and more particularly is directed to the structure and form of clutch discs of the cushion type, which carry the friction elements of the clutch plate driven members. A disc of this type is ordinarily attached to a driven shaft for operatively engaging the engine flywheel and an axially shiftable pressure plate carried thereby, the flywheel and pressure plate constituting driving members.

The present necessity of constructing the clutch discs larger and stronger to accommodate the current trend toward engines of a higher horse power, has presented an acute problem concerning the flexibility of the clutch discs particularly with respect to their outer zones which assist in providing a cushioning effect to dampen or counteract vibrations and chattering of the clutch.

In the designing of a clutch disc to obtain a smooth action when starting up from a standstill position, it is desirable to have the rim or outer circumferential section or sections which support the friction facings so constructed and arranged that application of the load of the clutch pressure springs will cause gradual flattening out of the disc. The form must be of such a character that the facings are properly mounted with a maximum amount of supporting area during the initial flattening out operation of the disc.

In one type of disc the desired flexibility in the rim section is obtained by grinding such section to a close tolerance to substantially reduce its thickness. An example of this is a disc made of .050 inch thick sheet steel with the rim section reduced to .033 inch by this method.

In another type the flexibility in the rim section is obtained by an arrangement in which such section is comprised of a number of individually formed spring steel segments of approximately .020 inch thickness having legs extending inwardly of the friction facings and riveted to an intermediate plate of substantial thickness to give it the necessary strength to prevent failure.

Other types of discs consist of plates as large in diameter as the outside of the friction facings and have attached to one side of the rim section a series of spring steel segments or cushions of various designs and forms with usually one facing attached directly to the plates and the other to the cushions.

An important object of the subject invention is to eliminate expensive grinding operations as well as the need for elaborate equipment, including the elimination of additional parts in the form of individual segments, rivets, and assembly costs.

This invention contemplates a clutch disc made in one integral piece from sheet steel preferably cold rolled to a suitable thickness, such as .040 to .043 or if necessary, to even closer tolerance, or other thickness. Modern cold rolling mills are able to roll high carbon steel to close tolerances and in widths exceeding, at the present time, 16". By the use of such material the thickness of the disc can be maintained within practical limits, thereby providing a disc of uniform thickness and adequate strength.

The invention further comprehends the provision of a clutch disc of adequate strength for incorporation in high powered motor vehicles and which has requisite flexibility in its outer zone for yieldably supporting clutch friction elements or facings and is adaptable for attachment to hub structure, the latter of which may embody a vibration dampening arrangement.

A particular object of the invention is to provide a unique driven clutch plate of simple, light, yet substantial construction, which will give long and efficient service and which will reduce the spinning inertia to a minimum and thereby facilitate easy shifting of the gears.

Another object of the invention is to provide a driven plate with relatively and yieldingly movable parts or portions whereby the clutch will take hold smoothly, evenly and quickly, and thereby avoid grabbing or jerking and vibrations in the clutch, engine, and transmission.

An important feature of the invention is to avoid or minimize the effect of localized high pressure areas in the clutch facings by providing for an even progressive distribution of the yielding effect in the outer zone of the disc over the entire surface of the friction elements.

A most significant object of the invention is to provide a disc structure which has in its rim section the characteristic of being yieldably compressible and which has portions which yield, or flex in such compressing action, and portions of large area which remain substantially flat to give the utmost support to the friction material but which is constructed in one piece, thus facilitating easy manufacture and assembly and the reducing of manufacturing costs.

Other objects and advantages of the invention will be apparent from the following description and the accompanying drawings, in which similar characters of reference indicate similar parts in the several views.

In the drawings:

Fig. 1 is a fragmentary elevational view of a clutch driven plate embodying the invention;

Fig. 2 is an axial sectional view taken substantially on line 2—2 of Fig. 1;

Fig. 3 is a view of one of the yieldable portions of the rim section of the disc; and Fig. 4 is a section taken substantially on line 4—4 of Fig. 3, illustrating details of construction.

In the preferred embodiment of the invention exemplified in Figs. 1 through 4 of the drawing, a clutch driven member, generally designated 1, comprises a metal disc 2 having fixedly secured thereto friction elements, linings or facings 3 which are adapted to be packed between conventional driving members (not shown) of a friction clutch. The disc 2 is mounted upon a hub 4 which may have an integrally formed flange 5 and splined as at 6 for attachment to a driven shaft (not shown).

A vibration dampening structure is associated with the disc 2 and the flange 5 to provide a flexible driving arrangement between them. For this purpose the disc 2 and the hub 4 may be connected by an arrangement in the form of an annulus of coiled springs 7 located in aligned openings in the disc 2, flange 5, and a washer 8. The openings in the disc, flange, and washer are indicated at 9, 10 and 11, respectively. The disc and washer are preferably connected together for simultaneous movement by means of long rivets 12, having reduced ends which extend through holes provided therefor in the disc, flange and an oil shield 13 and are upset as shown in Fig. 2. The rivets 12 also include enlarged cylindrical portions 14, which extend through notches 15 in the periphery of the flange and serve to maintain the disc and washer in spaced parallel relationship, the size of the notches 15 and the enlarged portions 14 of the rivets being such that relative movement may take place between the disc and washer as a unit and the hub. This relative movement may be controlled and dampened in some measure by friction material 16 disposed between the hub flange and the washer and disc. Driving forces are transmitted from the disc 2 to the hub 4 and vice versa through the coil springs 7, and when they flex there is a spring loaded friction action afforded between the friction material 16.

It will be observed that the openings 9 in the disc and the openings 11 in the washer have radial dimensions less than the diameter of the springs so that the springs will be held in proper operative positions; also that the corners of all openings are preferably rounded to avoid fracture of the materials.

The coil springs are desirably constructed of high carbon steel and in order to provide a substantial factor for holding the springs in operative positions, the disc and washer are preferably of high carbon heat-treated steel so as to minimize the wear tending to enlarge the openings within which the springs are disposed. Moreover, the openings in the disc and washer are preferably formed to provide surface contact with the springs, and in this respect the inner and outer margins defining the openings are inclined or bevelled as clearly indicated in Fig. 2. It will also be observed that the end margins of the openings 10 in the hub flange provide abutments for the ends of the coiled springs and that the widths of the openings are such that sufficient clearances are provided for the convolutions of the springs when flexed. The springs are straight and cylindrical form in overall dimensions and when one end is picked up by a driving or vibrating force and shifted relative to the walls of the openings the same moves in an arc around the hub center.

Preferably, the springs are under compression when the openings, above referred to, are in alignment, and as a result the springs are tensioned more in their portions radially removed from the axis of rotation than in the portions next adjacent to the axis of rotation; this tends to urge the springs bodily inwardly, thereby overcoming a centrifugal force, influencing their outward movement. The springs are thus arranged in a more or less neutral position in the openings and so that galling between the springs and portions of the members housing them is minimized. Moreover, it is desirable that the end convolutions of the springs be rounded off to prevent excessive wear on certain margins of the openings.

In the arrangement illustrated, six coil springs are employed, and in structures of higher torque capacity, eight or ten, or more, springs may be required.

The assembly above described is very easily made, as the parts may be properly positioned, the springs inserted into the openings, and the several rivets 12 connecting the parts upset to complete the assembly. This set up eliminates any threading operation which is necessary where the springs are held in place by strips, wires or elements threaded through such springs.

Having thus described one form of vibration dampening arrangement which may be advantageously employed in the present invention, the disc 2 and its construction and form will now be described in detail.

Referring to Figs. 1 and 3 of the drawing, the disc body advantageously is of spoke construction. The spokes 17 are preferably formed by providing the disc with generally T-shaped openings 18, the legs of the T s interrupting the periphery of the disc at regular intervals.

Each spoke preferably includes, among other things, a circumferentially extending head portion 19 joined to the inner body section of the disc by an intermediate restricted portion or neck 20. The circumferential width of the head portion adjacent its periphery 21 is slightly greater than at its base portion adjacent the inner straight marginal edges 22, which are arranged in a generally parallel relation to the section line 4—4 in Fig. 3. The straight marginal edges 23 defining the ends of the head are preferably convergent. The inner corners of each spoke end and the edges defining the neck may be rounded as shown. It will be noted that the radial widths of the spokes substantially correspond to the widths of the facings.

Each spoke head may be considered as three portions joined at the bend lines 26. A central area 24 of symmetrical trapezoid shape lying within the two bend lines 26 and two adjacent side areas 25 lying outside the bend lines 26. At 27 are other bend lines. The areas 25 have two U openings 28 with the innermost edges 29 lying substantially on the bend lines 26. The shape of the opening is such as to create arms 30 and 31 connecting the central portion 24 to the two outermost portions 32 of the spoke head. The arms 30 and 31 are tapered in width being narrower at the end nearest the bend lines 27 to give a more uniform stress distribution when bending under load. The average width of the inner arms 31 is substantially less than that of the outer arms 30 to compensate for the lesser circumferential length 33 at the inner diameter compared to the length 34 at the outer diameter. The proportions are worked out so that if each set of arms could be loaded independently and the deflection measured it would require a greater load on the outer set of arms to cause the same amount of deflection as at the inner arms.

The form imparted to the spoke heads leaves the central area 24 in plane with the neck and inner portions of the disc and the two adjacent side areas 32 and 32a parallel with area 24 but out of plane perhaps .050". The arms 30 and 31 are inclined between the bend lines 26 and 27 by an amount equal to the out of plane of surfaces 24 and 32, 32a. Surface 24 is flat and surfaces 32 and 32a are one and the same lying in plane with each other.

Friction facing rings are attached to either side of the disc by rivets through holes 35 and 36. One facing lies on and is supported by surface 24 being attached through hole 35, while the other facing lies on and is supported by surfaces 32, 32a being attached by rivets through holes 36. The facings are attached independently of each other.

A principal feature of this invention is the utilization of the tongue-shaped area 32a to give additional support to the one friction facing. This forms an initial as well as a final support when under full load.

In other designs of discs where no openings are used and employing an undulated type of rim section, the facings are supported initially by only those surfaces constituting the peak or high land of the undulation. When the clutch is engaged and greater loading compresses the disc, the area of support gradually increases becoming maximum when the disc is flat. However, during the process of becoming flat and even when flat the unit pressure exerted by the disc against the backs of the facings varies greatly, being maximum at those surfaces giving initial support to the facings and minimum, almost zero, at points between those surfaces. This variation in unit pressure between the disc and the backs of the facings causes brinelling of the facings and greater wear at the points of highest unit pressure. In time the effect is the same as if the disc had lost a substantial amount of its original form height and chatter and rough engagement result. It is therefore of prime importance that the facings have as much initial support as possible, so that the variation in unit pressure under loaded conditions is held to a minimum.

The constructions are such that the facings are normally held in axially spaced relation, but are capable of moving toward each other as the disc is collapsed or compressed incident to being packed by the clutch driving member. As engagement of the clutch progresses the unit pressure on the facings increases proportionately reaching a maximum when the rim section becomes substantially flat under a full spring load.

A smoother engagement and better performance is obtained if the wear pattern is heavier toward the outside rather than toward the inside. Measured circumferentially, more facing area exists at the outside; and with the higher unit pressures nearer the outside, greater torque capacity is obtained from a given diameter of clutch.

The invention provides for a considerable number of cushion members which may be disposed in an annular array on a given radius, thus forming an increased number of points or locations of support for the facings. The structure embodied in the subject invention contributes to a smooth acting clutch and counteracts any tendency for the clutch to chatter or grab during clutch engagement.

Moreover, the distance between the points of support may be of adequate length without decreasing the number of supporting points. It will be understood, of course, that where the distance between supporting points is short, resistance to flexure is increased. As a result, the stock of which the disc is made, need not be so thick, and, accordingly, the desired type and gauge of stock may be employed to meet the specifications required.

It will, therefore, be seen that the present invention provides a clutch disc which obtains a desired deflection curve and at the same time this is accomplished without the use of separate spring inserts and other expensive features found in prior art structures.

In fact, a minimum number of parts are required, namely, the disc itself and two facings. Of course, the invention can be used without the vibration dampening hub construction hereinbefore described, in which event the disc may be fastened directly to the hub. Thus, the invention not only provides a structure wherein a desired nicety of deflection is obtained, but at the same time provides a clutch member uniformly simple in construction and composed of a minimum number of parts.

The advantages of the present clutch disc may, therefore, be summarized as follows:

1. Capable of picking up its load smoothly, evenly, and without grab or chatter.
2. Low moment of inertia to permit easy gear shifting.
3. Dampens out any vibration of the crankshaft to prevent gear clatter;
4. Easily varied to suit a particular make of vehicle;
5. Economical to manufacture; one piece construction;
6. Facings can be readily serviced in the field.

While I have illustrated one application of the invention it is to be understood that many other modifications may be made without departing from the spirit of the invention, and I do not wish to be limited to the precise details of the construction set forth, but desire to avail myself of all changes within the scope of the appended claims.

I claim:

1. In a clutch driven plate having a hub and axially spaced friction facings arranged outward therefrom; facing mounting means comprising a sheet metal disc carried by said hub and extending radially outward therefrom; a plurality of circumferentially spaced spoke-like cushions integral with said disc and extending radially outward therefrom and lying between said facings, each cushion having a flat central region extending radially outward from said disc and lying in the plane thereof for flat surface contact with a first friction facing; radial end lands arranged one at each side of said radial central region, said radial lands lying in a common plane offset to the plane of said disc and said radial central region for contact with a second friction facing; circumferentially exending tongues projecting toward each other from said radial end lands and lying in the common plane thereof, said tongues terminating adjacent the radial sides of said flat central region; radially spaced inner and outer circumferential regions connecting each radial end land to the radial sides of said flat central region and arranged oblique to the plane of said disc; means attaching one friction facing to the cushions at one of the radial end lands of each cushion; and means attaching the other friction facing to the cushions at the flat central region of each cushion.

2. A clutch driven plate as defined in claim 1 wherein the cushions have generally T-shaped contour, and the tongues of the plurality of cushions define an annular row in circumferentially spaced order approximately midway between the inner and outer peripheral edges of said cushions, all of the tongues being in a common plane offset on one side of the plane of the disc.

3. In a clutch driven plate having a hub, and axially spaced friction facings arranged outward therefrom; facing mounting means comprising a sheet metal disc carried by said hub and extending radially outward therefrom; a plurality of circumferentially spaced cushions of generally T-shape contour extending radially outward from said disc and lying between said facings for spacing said facings, each cushion comprising a radially outer set of circumferentially spaced regions arranged oblique to the plane of said disc; a radially inner set of circumferentially spaced regions arranged oblique to the plane of said discs; said sets of oblique regions being radially spaced from each other; a plurality of radial lands extending from the inner margin to the outer margin of each cushion and connecting said sets of oblique circumferential regions, said radial lands lying in a common axially offset plane with respect to the plane of said disc for flat surface contact with a first friction facing; a plurality of circumferentially extending tongues projecting from said radial lands into the spaces between said inner and outer oblique circumferential regions; said tongues and lands lying in a common plane and in contact with said first friction facing; said lands and their respective tongues defining a plurality of flat surfaces for providing support of considerable superficial area for said first friction facing; intermediate flat radial regions in said cushions lying in a plane offset to the plane of said lands and connected at their radial side edges to said inner and outer circumferential sets of oblique regions, said intermediate radial regions lying in flat surface contact with a second friction facing; and means attaching said facing to certain of the aforesaid flat surfaces.

4. In a clutch driven plate having a hub, and axially spaced friction facings arranged outward therefrom; facing mounting means comprising a sheet metal disc carried by said hub and extending radially outward therefrom; a plurality of circumferentially spaced cushions of generally T-shape contour extending radially outward from said disc and lying between said facings for spacing said facings, each cushion comprising a radially outer set of circumferentially spaced regions arranged oblique to the plane of said disc; a radially inner set of circumferentially spaced regions arranged oblique to the plane of said disc and radially from said outer set of oblique regions; a plurality of radial lands at the ends of said cushions and extending from the inner margin to the outer margin of each cushion and connecting said sets of oblique circumferential regions, said radial end lands lying in a common plane axially offset with respect to the plane of said disc for flat surface contact with a first friction facing; a plurality of circumferentially extending tongues projecting from said radial end lands into the spaces between said inner and outer oblique circumferential regions; said tongues and lands all lying in a common plane and in contact with said first friction facing, said lands and their respective tongues defining a plurality of flat surfaces for providing support of considerable superficial area for said first friction facing; intermediate flat radial regions in all of said cushions lying in the plane of said disc and connected at their side edges to said inner and outer circumferential sets of oblique regions, said intermediate radial regions lying in flat surface contact with a second friction facing; and means attaching said facings to certain of the aforesaid flat surfaces.

REINHOLD C. ZEIDLER.

REFERENCES CITED

The following references are of record in the file of this patent:

UNITED STATES PATENTS

| Number | Name | Date |
|---|---|---|
| 1,659,289 | Gamble | Feb. 14, 1928 |
| 2,101,410 | Nutt et al. | Dec. 7, 1937 |
| 2,194,793 | Higgs | Mar. 26, 1940 |
| 2,282,981 | Jarrett | May 12, 1942 |
| 2,327,884 | Goodwin | Aug. 24, 1943 |
| 2,391,495 | Wemp | Dec. 25, 1945 |
| 2,566,394 | Zeidler | Sept. 4, 1951 |

FOREIGN PATENTS

| Number | Country | Date |
|---|---|---|
| 477,794 | Great Britain | Jan. 6, 1938 |